April 15, 1952     J. L. LUDLOW     2,592,814
ISOLATION OF CHOROSULFONATED POLYMERS OF ETHYLENE FROM SOLUTION
Filed Dec. 20, 1947
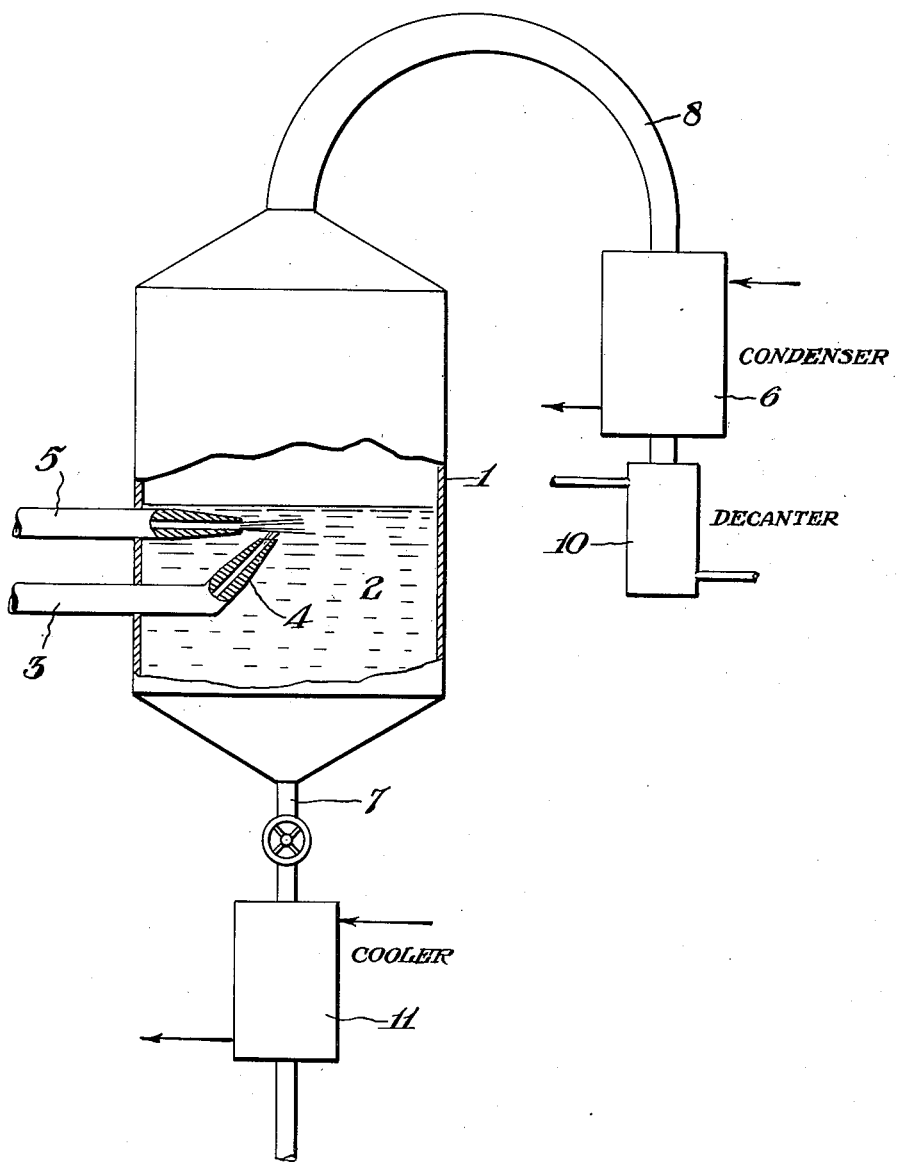
INVENTOR.
John L. Ludlow
BY
ATTORNEY Patented Apr. 15, 1952

2,592,814

UNITED STATES PATENT OFFICE 2,592,814

ISOLATION OF CHLOROSULFONATED POLYMERS OF ETHYLENE FROM SOLUTION

John L. Ludlow, Wilmington, Del., assignor to E. I. du Pont de Nemours & Company, Wilmington, Del., a corporation of Delaware Application December 20, 1947, Serial No. 792,886

1 Claim. (Cl. 260—79.3)

This invention relates to a process for isolating substituted hydrocarbons from solution, and more particularly to the isolation of halosufonated hydrocarbons from the solvent medium in which they have been halosulfonated.

Processes are known for the halogenation and halosulfonation of saturated and unsaturated hydrocarbons. In the Myles et al. U. S. Patent 2,398,803, issued April 23, 1946, there is described a process for the preparation of chlorinated polymers of ethylene, wherein ethylene polymers are chlorinated in a carbon tetrachloride solution. The product is isolated in a finely divided state from the solution by violent agitation with hot water, the carbon tetrachloride being distilled off during the isolation. The Reed U. S. Patent Re. 20.968, issued January 3, 1939, describes a process for the treatment of hydrocarbons with sulfur dioxide and chlorine in which the hydrocarbon is, prior to chlorosulfonation, dissolved in an inert solvent. The McQueen U. S. Patent 2,212,786, issued August 27, 1940, also describes a process for the chlorosulfonation of olefins which, prior to treatment, are dissolved or suspended in carbon tetrachloride. McQueen recovers his product after first distilling out carbon tetrachloride.

The aforesaid patentees prepare halongenated and halosulfonated hydrocarbons in solution which substituted hydrocarbons, prior to use, must be subjected to some kind of treatment for recovery. The halosulfonated hydrocarbons, and more particularly those prepared from high molecular weight hydrocarbons and polmeric compounds, are rubber-like in character and difficult because of their stickiness and other rubber like properties to isolate, especially in a granular form.

An object of the present invention is to provide a process for the isolation of halosulfonated hydrocarbons from solutions containing them. Another and more specific object is to provide, as new compositions of matter, halosulfonated hydrocarbons in granular form. Yet, another object is to provide a process wherein solutions of chlorosulfonated hydrocarbons are subjected to steam distillation in such a manner that the substituted products are obtained as solvent-free discrete granules. Other objects and advantages of the invention will hereinafter appear.

The above and other objects are accomplished in accord with the invention by forcing a stream of halosulfonated hydrocarbons, in a solvent, into direct contact with a steam jet. The direction of the solution is so adjusted with respect to the steam jet that not only is the solvent vaporized completely from the substituted compound, but also the compound is comminuted by the force of the impact with the steam. To facilitate the recovery of the granular product, formed as a result of the collision, the impact is effected below the surface of a liquid medium, and to prevent the granules from sticking together, a colloid is preferably used during the isolation to aid the granulation and to improve the product.

The invention can be more readily understood by reference to the attached drawing which diagrammatically illustrates one manner of conducting the process. The vessel 1 contains a liquid 2 which is a non-solvent of the halosulfonated hydrocarbon. The substituted hydrocarbon in solution is forced through pipe 3 and nozzle 4, having a restricted discharge opening, into vessel 1. The stream of the hydrocarbon is directed across the orifice of steam jet 5 through which the steam is forced into vessel 1 at a sufficiently high velocity and under suitable pressure to maintain, on the one hand, the liquid 2 at a temperature above the boiling point of the solvent of the substituted hydrocarbon, and on the other hand, to atomize the substituted hydrocarbon. The resultant vaporized solvent passes through the vapor collector 8 to condenser 6 and decanter 10 from which it can be recovered for reuse. The solvent-free halosulfonated hydrocarbons, as discrete particles, form a slurry in the liquid medium 2, and are withdrawn from the vessel through pipe 7 and tubular cooler 11. The product is subsequently separated from the inert non-solvent liquid 2 in any suitable manner.

In selecting a medium in which the injectors 4 and 5 are submerged and in which to collect the compound and separate it from its solvent, a medium is chosen that can preferably be readily and completely recovered by simple filtration and drying from the granulated compound, and which has a boiling point above that of the solvent used. Water is the outstanding example of such a medium.

The process may be illustrated generally for the isolation of chlorosulfonated normally solid polythene from its solution in carbon tetrachloride as this substituted polymer is prepared, for example, by the process described in the McQueen patent ibid. The chlorosulfonated polymer of ethylene may be produced dissolved in carbon tetrachloride to give a solution containing from 6 to 10% by weight of the polymer. The polymer is forced through nozzle 4 and meets steam passing through jet 5 at a rate between about 0.5 to 1.5 pounds of steam per pound of carbon tetrachloride. Prior to the operation, the vessel 1 is partly filled with water or condensed steam, the liquid brought to 100° C. and maintained at a pH of about 9 by the addition of sodium hydroxide. As the carbon tetrachloride solution collides with the steam, the polymer, solvent and polymer-solvent solution is atomized and heated simultaneously. This is accomplished so rapidly that the chlorosulfonated polymer coagulates substantially immediately to discrete solid particles and forms with the water a slurry which is discharged from vessel 1 through pipe 7 and cooler 11, from which it is passed to filtration and drying equipment, not shown, for the final preparation of the product. More specifically the invention is illustrated by this example in which parts are by weight unless otherwise stated.

*Example.*—A solution of 7% chlorosulfonated polythene in carbon tetrachloride at 50° C. is pumped at a rate of 150 lbs. per hr. through a 1/8" I. D. nozzle into the path of steam emerging from a 3/16" I. D. nozzle at a rate of 120 lbs. per hr. The steam is directed tangentially into a 12" I. D. vessel containing a water-polymer slurry at approximately 95° C. The slurry containing about 1% by weight of polymer is withdrawn from the bottom of the vessel through a tubular cooler and the polymer is filtered from the slurry at 60-70° C. The mixed vapors from the isolation vessel are directed to a condenser and the condensed steam and carbon tetrachloride are separated in a decanter. Agglomeration of polymer particles in the isolation vessel is avoided by continuous addition of .01 gelatin based on the dry polymer.

As has been stated, many of the halosulfonated compounds are soft, tacky and have other rubber-like properties, particularly when hot, that make them very difficult to collect and recover in granular form. The chlorosulfonated solid polymers of ethylene, the solid polymers of ethylene prior to chlorosulfonation having an intrinsic viscosity between 0.7 and 1.4 (measured as a 0.125% solution in xylene at 85° C.), such as are prepared by the McQueen patent containing from 0.5 to 6% sulfur and from 20 to 40% chlorine can be formed as granules with or without the aid of a colloid but are more stable and free flowing when formed in the presence of a colloid and particularly gelatin. Discrete particle formation of the substituted polymers is aided if there is present in bath 2 a colloidal material to disperse and maintain dispersed the substituted compound being isolated. For this purpose any suitable dispersing agent of a colloidal nature may be employed such, for example, as gelatin, sodium stearate, zinc stearate, starch, casein, methyl starch, albumin, and the like. These colloids are effective when present to the extent of from 0.001%, based on the weight of a collecting medium such as water, to about .1% gelatin is effective when present in amounts as low as 0.001% in water, while starch does not have equivalent effectiveness unless used in a concentration of 0.1% based on the weight of water. It has, likewise, been found desirable to maintain the aqueous medium alkaline during the isolation. The addition of any suitable organic or inorganic base or basic salt may be used to give a pH above 7 such, for example, as the alkali metal or alkaline earth metal hydroxides, carbonates or bicarbonates; the salts or strong bases with weak acids such as sodium stearate, sodium oleate, etc.

Generally speaking, when the process is conducted as hereinabove described, discrete granular particles will be provided after filtration and washing. In some instances, however, such, for example, as in the treatment of chlorosulfonated polythene having a chlorine content of about 35% and a sulfur content of about 2%, some agglomeration will occur during filtering unless this step is conducted at a temperature below about 60° C.

The process of the invention may be employed in the preparation of granular products from any of the compounds of the aforesaid patents which are prepared in solution, the liquid bath 2 being a non-solvent of and for the product to be granulated and preferably also for its solvent. Moreover, while it is desirable to maintain the liquid 2 above the boiling point of the solvent, nevertheless, no liquid should be used that boils at and is used at such a high temperature that products are decomposed or degraded after granulation and before separation.

I claim:

In a process for the isolation from solution of a chlorosulfonated polymer of ethylene, the steps which comprise forcing a carbon tetrachloride solution of a chlorosulfonated normally solid polymer of ethylene, containing from 6 to 10% by weight of the polymer, through an orifice and transversely into a steam jet directed across the orifice opening, the stream of polymer solution in carbon tetrachloride and the jet being submerged beneath the surface of water containing a colloidal dispersing agent and maintained at a pH of above 7 by the presence of a compound of the group consisting of alkali metal, alkaline earth metal and organic basic salts, the velocity and volume of flow of solution and steam being such that the polymer is atomized and freed from carbon tetrachloride as a granular crumb-like particle adapted for mixing and compounding on mill rolls with facility.

JOHN L. LUDLOW.

REFERENCES CITED

The following references are of record in the file of this patent:

UNITED STATES PATENTS

| Number | Name | Date |
|---|---|---|
| 2,202,481 | Cox | May 28, 1940 |
| 2,212,786 | McQueen | Aug. 27, 1940 |
| 2,317,149 | Lemanski | Apr. 20, 1943 |
| 2,389,958 | Crawford | Nov. 27, 1945 |
| 2,390,853 | Taylor | Dec. 11, 1945 |
| 2,401,754 | Green | June 11, 1946 |
| 2,448,524 | Gentner | Sept. 7, 1948 |